United States Patent [19]
Chakravarty

[11] Patent Number: 5,457,634
[45] Date of Patent: Oct. 10, 1995

[54] TIME-RESPONSIVE FLIGHT OPTIMIZATION SYSTEM

[75] Inventor: Abhijit J. M. Chakravarty, Renton, Wash.

[73] Assignee: The Boeing Company, Seattle, Wash.

[21] Appl. No.: 512,618

[22] Filed: Apr. 11, 1990

Related U.S. Application Data

[63] Continuation of Ser. No. 309,444, Feb. 13, 1989, abandoned, which is a continuation of Ser. No. 826,525, Feb. 6, 1986, abandoned.

[51] Int. Cl.$^6$ .................................................. G06F 165/00
[52] U.S. Cl. .......................... 364/444; 364/446; 73/178 R; 340/994
[58] Field of Search .............................. 364/424.01, 439, 364/443, 444, 442, 446–448; 73/178 R; 340/994

[56] References Cited

U.S. PATENT DOCUMENTS

| | | | |
|---|---|---|---|
| 2,766,953 | 10/1956 | Cummings | 244/197 |
| 3,612,837 | 10/1971 | Brandau | 364/442 |
| 4,220,994 | 9/1980 | Hendrickson | 364/444 |
| 4,312,041 | 1/1982 | DeJonge | 364/442 |
| 4,371,934 | 2/1983 | Wahl et al. | 364/444 |
| 4,642,775 | 2/1987 | Cline et al. | 364/444 |

FOREIGN PATENT DOCUMENTS 851576  9/1970  Canada.

OTHER PUBLICATIONS

"Delco Electronics Flight Management System for Air Force C–141 Aircraft" by Farmer, Published in Proceedings of the IEEE 1980 National Aerospace and Electronics Conference NAECON 1980, May 20–22, 1980, pp. 191–198.

Primary Examiner—Gary Chin
Attorney, Agent, or Firm—James P. Hamley

[57] ABSTRACT

An onboard flight management system produces cost-effective trajectory target signals in response to an input desired time of arrival. Aircraft monitoring systems produce signals corresponding to real-time aircraft parameters including fuel flow rate, airspeed, windspeed, thrust, drag and mass. Stored in memory are aircraft characteristics including time cost, fuel cost, and acceleration due to gravity. A flight computer responds to an input desired time-of-arrival and the real-time parameters and stored characteristics signals and produces cost-effective trajectory target signals. The computer employs multiply regressed drag and fuel flow models which avoid trajectory discontinuities and the trajectory targets are produced using a Fibonacci search technique, which is computationally very efficient.

12 Claims, 5 Drawing Sheets

TIME-RESPONSIVE FLIGHT OPTIMIZATION SYSTEM

This is a continuation, of application Ser. No. 07/309,444, filed Feb. 13, 1989 which was a continuation of Ser. No. 826,525 filed Feb. 6, 1986 now both abandoned.

BACKGROUND OF THE INVENTION

The present invention pertains to the aircraft flight management art and, more particularly, to a flight management computer system which responds to an input time of arrival to produce cost effective trajectory target signals.

While numerous aircraft flight management control systems are known to the prior art, none of these systems is capable of producing optimum trajectory and thrust settings to achieve a desired time of arrival. Presently, a pilot, upon receiving a rescheduled time of arrival, will either alter his thrust but maintain present trajectory or, upon arrival early at a destination, assume a holding position until a landing can be accomplished. Whichever of these options the pilot chooses, it is doubtful that the aircraft trajectory and thrust levels are optimum for the most cost effective aircraft operation.

Overall flight planning is presently performed by on-ground dispatch computers. During flight, however, as time of arrival is rescheduled, the aircraft's onboard flight management system is incapable of computing the optimum trajectory and thrust levels to achieve the desired time of arrival. As a result, aircraft have been flown in less than optimum cost effective conditions, thereby leading to wasted fuel and increased cost of operation.

SUMMARY OF THE INVENTION

The present invention, therefore, is directed to an improved aircraft airborne flight management computer system, which system is capable of producing optimum trajectory and thrust target values as a function of desired time of arrival.

Briefly, according to the invention, an aircraft time-responsive trajectory optimization system includes a monitor for producing signals representative of predetermined real time aircraft parameters. Onboard memory stores and produces signals representing predetermined aircraft performance characteristics. A system input is provided for producing signals representing a desired aircraft time and place of arrival. Onboard processing means, preferably in the form of a flight management computer, processes the signals produced by the monitor, memory and system input to produce target aircraft trajectory and speed signals corresponding to an optimum cost effective flight trajectory for arriving at the desired time.

In one aspect of the invention, the monitor produces signals representative of fuel flow rate, f, airspeed, V, windspeed, $V_w$, thrust, T, drag, D, and aircraft mass, m. The onboard memory stores and produces signals representative of aircraft cost index, $C_t$, fuel cost index, $C_f$, and the acceleration due to gravity, g. The onboard processing means produces aircraft thrust and airspeed values which minimize the expression:

$$\min_{T,V} \left\{ C_t + (C_f - \lambda_m)f + \lambda_x(V + V_w) + \right.$$

$$\left. \lambda_E \frac{(V + V_w)(T - D)}{mg} \right\} = 0,$$

where $\lambda_x$, $\lambda_m$ and $\lambda_E$ are predeterminedly calculated signal values corresponding to the range, mass and energy adjoint variables, respectively.

In a further aspect of the invention, the processing means includes means for producing optimal cruise target signals and the range adjoint variable, $\lambda_x$, in accordance with:

$$-\lambda_x = \min_{h, V_{cr}} \left\{ \frac{C_t + (C_f - \lambda_m)f}{V_{cr} + V_w} \right\}_{T=D},$$

where h is a signal representative of aircraft altitude and the processing means thereby produces target altitude and airspeed signals.

In yet a further aspect of the invention, the processing system includes means for producing optimal aircraft climb target signals and the energy adjoint variable, $\lambda_E$, in accordance with:

$$\lambda_E = \frac{-\min}{V_c, T_c \leq T_{max}} \left\{ \frac{C_t + (C_f - \lambda_m)f + \lambda_x(V_c + V_w)}{(T_c - D)(V_c + V_w)/mg} \right\}_E,$$

wherein $T_{max}$ is a predetermined maximum thrust signal level and the signal processing system thereby produces target airspeed and thrust signals.

In still a further aspect of the invention, the processing system includes means for producing optional aircraft descent target signals and the energy adjoint variable, $\lambda_E$, in accordance with:

$$\lambda_E = \frac{-\max}{V_d, T_d \geq T_{min}} \left\{ \frac{C_t + (C_f - \lambda_m)f + \lambda_x(V_d + V_w)}{(T_d - D)(V_d + V_w)/mg} \right\}_E,$$

where $T_{min}$ is a predetermined minimum thrust signal level, and the signal processing system thereby produces target airspeed and thrust signals.

DETAILED DESCRIPTION

Figure 1:
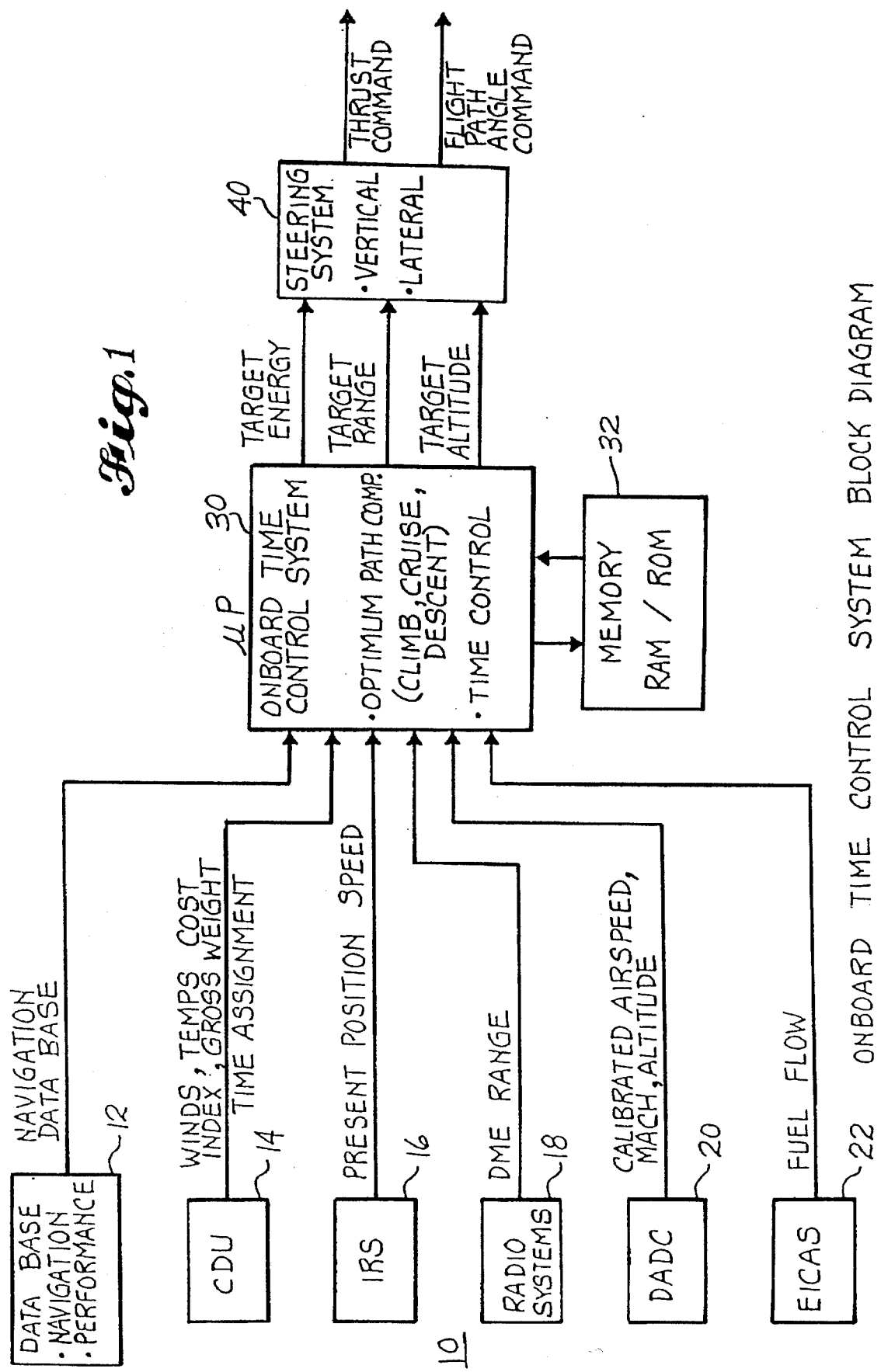
FIG. 1 is a block diagram illustrating the principal hardware components of the preferred embodiment of the invention.

FIG. 1 is a detailed block diagram illustrating the various hardware components which comprise the preferred embodiment of the invention. Here, aircraft onboard monitoring systems, indicated generally at 10, include a data base system 12, a control display unit (CDU) 14, an inertial reference system (IRS) 16, onboard radio systems 18, a digital air data computer (DADC) 20, and an engine indication and alerting system (EICAS) 22.

The data base system 12 is normally included within an onboard flight management computer system. Provided within the data base is information relating to navigation and aircraft performance characteristics. Corresponding navigation and performance data base signals are routed to an onboard computer system 30.

The control display unit 14 provides two-way communication between the flight crew and the onboard computer 30. This unit allows the flight crew to input parameters such as windspeed, temperature, cost-index, gross weight, and time assignment (i.e. desired time of arrival) to the computer 30 and correspondingly receive computer control information.

The inertial reference system 16 provides inputs to the computer 30 corresponding to the aircraft's present position and speed.

The radio systems 18 provide ranging information such as are produced by distance measuring equipment (DME).

The digital air data computer 20 produces output signals corresponding to aircraft calibrated airspeed, Mach and altitude.

Finally, the engine indication and alerting system 22 produces inputs to the computer 30 corresponding to fuel flow.

The onboard computer 30 not only receives the inputs from the monitoring systems 10, as well as the input system through the control display unit 14, but also interfaces with associated memory 32. In this, the preferred embodiment of the invention, memory 32 includes both random access memory (RAM) and read only memory (ROM). Stored in the electronic memory 32 are signals corresponding to aircraft characteristics and algorithms to be used by the onboard computer 30 in calculating the target trajectory and thrust level settings.

In accordance with the logic flow diagrams shown in FIGS. 2–5, the onboard computer receives the monitor signals, memory signals and input signals to produce target range and thrust signals, indicated as outputs labeled "TARGET ENERGY," "TARGET RANGE," and "TARGET ALTITUDE." These signals correspond to the optimum trajectory signals for achieving cost effective flight operation. A particular feature of the present invention is that these signals reflect optimum trajectory and thrust values corresponding to rescheduled time assignment, i.e., time of arrival, inputs.

The target energy, range and altitude signals are passed to an aircraft steering system 40. The aircraft steering system, of conventional design, processes the input target values and produces output command thrust and flight path angle command signals. These signals are then routed to the aircraft's engines and control surfaces, respectively, to achieve the desired target values.

The algorithms used by the onboard computer 30 to achieve optimum cost-effectiveness thrust and trajectory target signals are understood as follows. The aircraft model used assumed a point mass approximation, that is, state variables describing the vehicle attitude were either omitted or used as control variables. The energy-state approximation of the point-mass longitudinal model of the aircraft, in the presence of wind, was then taken in conventional state variables as follows:

$$\frac{dx}{dt} = V + V_w \tag{1}$$

$$\frac{dm}{dt} = -f \tag{2}$$

$$\epsilon \frac{dE}{dt} = \frac{(V+V_w)(T-D)}{mg} - V_w \gamma \tag{3}$$

where x is representative of range, V represents airspeed, $V_w$ represents windspeed, m represents mass, f represents fuel flow rate, E represents the energy height (specific energy), $\gamma$ represents air mass flight path angle, T represents thrust, and D represents drag. The second term on the right-hand side of equation (3) is normally small and can usually be neglected. The value $\epsilon$ is a small "singular perturbation" parameter that arises as a consequence of the particular aircraft dynamics and an appropriate choice of scaling the equations of motion. The energy height E is related to the altitude and the groundspeed through:

$$E = h + (V+V_w)^2/2g \tag{4}$$

The airspeed V and the thrust T are the control variables, varying within the limits $$T_{min} \leq T \leq T_{max} \tag{5}$$

$$V_{min} \leq V \leq V_{max} \tag{6}$$

Both $V_{min}$ and $V_{max}$ are functions of altitude and represent the controllability and structural limitations on the aircraft. The airplane model also involves the fuel flow rate f(h,M,T), the drag polar $C_D(C_L,M)$ and minimum and maximum thrust $T_{min}(M,h)$, $T_{max}(M,h)$, respectively, which are modeled using multiple regression methods. M denotes the Mach number, $C_D$ the drag coefficient, $C_L$ the lift coefficient, and h the altitude.

PERFORMANCE INDEX

The optimization problem is to steer the system described by equations (1)–(3) from an initial state $(x_i, m_i, E_i)$ at time $t_i$ to a final state $(x_f, m_f, E_f)$ at a fixed final time $t_f$ so that the fuel spent is minimized. Equivalently, tile goal is to minimize the expression:

$$J = \int_{t_i}^{t_f} C_f dt \tag{7}$$

where J is a cost function and $C_f$ is the cost of fuel.

PONTRYAGIN'S MINIMUM PRINCIPLE

The Hamiltonian for equations 1–3 and 7 is:

$$H_1 = C_f + \lambda_x(V+V_w) - \lambda_m f + \lambda_E \frac{(V+V_w)(T-D)}{mg} \tag{8}$$

where $\lambda_x$, $\lambda_m$ and $\lambda_E$ are the range, mass and energy adjoint variables, respectively and g represents the acceleration due to gravity. Pontryagin's Minimum Principle states that the Hamiltonian is minimum along an optimal trajectory. Furthermore, since the final time is fixed and $H_l$ is not an explicit function of time, $H_l$ is constant along the optimal trajectory and given by:

$$\min_{T,V} \{H_1\} = K \quad (9)$$

where K has the units of cost per unit time. If we define $C_t = -K$, equation (9) may be rewritten $$\min_{T,V} \left\{ C_t + (C_f - \lambda_m)f + \lambda_x(V + V_w) + \lambda_E \frac{(V + V_w)(T - D)}{mg} \right\} = 0 \quad (10)$$

along the optimal trajectory.

The symbol $C_t$ is a cost of time to fly the four-dimensional optimal trajectory. The problem reduces, therefore, to a direct operating cost optimization problem with free terminal time and cost parameters $C_f$ and $C_t$. The balance between fuel and time costs may be expressed by the cost index $$CI = C_t/C_f \quad (11)$$

The traditional units used in the cost index are $C_t$ in dollars per hour and $C_f$ in cents per pound. The four-dimensional optimization problem is now reduced to finding the correct $C_t$ or CI for an assigned arrival time $t_f$.

CRUISE COST FUNCTION

Cruise is that condition of flight in which thrust equals drag. Using the present methodology, the cruise problem must be solved before climb and descent solutions can be obtained. As $\epsilon$ approaches zero, the cruise solution (outer solution according to singular perturbation theory) is reduced to:

$$\min_{h,V_{cr}} \{C_t + (C_f - \lambda_m)f + \lambda_x(V_{cr} + V_w)\} = 0 \quad (12)$$
$$(T = D)$$

Using Pontryagin's Minimum Principle, we then get:

$$-\lambda_x = \min_{h,V_{cr}} \left\{ \frac{C_t + (C_f - \lambda_m)f}{V_{cr} + V_w} \right\}_{T=D} \quad (13)$$

where the ratio to be minimized is the cruise cost function.

CLIMB/DESCENT COST FUNCTION

During climb/descent, equation (10) is transformed into:

$$\min_{T,V} \left\{ C_t + (C_f - \lambda'_m)f + \lambda'_x(V_d + V_w) + \lambda_E \frac{(V + V_w)(T - D)}{mg} \right\} = 0 \quad (14)$$

where $\lambda_m$ and $\lambda_x$ correspond to the values produced during the cruise mode. To minimize equation (14), the energy adjoint is taken as:

$$\lambda_E = \frac{-\min}{V_c, T_c \leq T_{max}} \left\{ \frac{C_t + (C_f - \lambda'_m)f + \lambda'_x(V_c + V_w)}{(T_c - D)(V_c + V_w)/mg} \right\}_E \quad (15)$$

for climb and $$\lambda_E = \frac{-\max}{V_d, T_d \geq T_{min}} \left\{ \frac{C_t + (C_f - \lambda'_m)f + \lambda'_x(V_d + V_w)}{(T_d - D)(V_d + V_w)/mg} \right\}_E \quad (16)$$

for descent.

The minimization is done to get the climb solution, and the maximization to get the descent solution. The ratio in equations (15), (16) to be optimized at current energy E is called the climb/descent cost function. The assumption here is that energy increases monotonically during time and decreases monotonically during descent.

While the detailed steps performed by the onboard computer to realize the optimization law are given in detail in FIGS. 2–5, the following brief explanation will aid in a complete understanding. The four-dimensional optimization problem is solved from an entry fix (cruise altitude) to an arbitrarily chosen metering fix altitude, such as 10,000 feet. The range covered is typically 150 to 200 nautical miles, but it could definitely be greater. The same algorithm can be used to generate the entire four-dimensional trajectory (climb/cruise/descent). If the optimal cruise altitude is below the present cruise altitude (e.g., when delay needs to be absorbed), there will be an initial descent segment to the optimal cruise altitude and a final descent segment from the optimal cruise altitude to the metering fix altitude. There will be no climb segment.

Conversely, if the optimal cruise altitude is above the present altitude, the initial segment will comprise a climb segment to the optimal cruise altitude. Irrespective of whether the initial segment is climb or descent, it is always computed forward (from the initial point to the optimal cruise altitude). In the present methodology, equations (15), (16) are optimized at discrete altitudes from the initial point to the optimal cruise altitude to get the optimal speed and thrust. A check should be made to ensure that energy is decreasing if in the descent mode and increasing if in the climb mode. At optimal cruise altitude, the altitude and speed of the initial segment should be forced to match with the cruise altitude and speed at that point. This requires the use of matched asymtotic expansions from singular perturbation theory.

The final descent segment is always computed backwards from the metering fix altitude to the optimal cruise altitude. Again, equations (15), (16) are optimized at discrete altitudes, ensuring that the total energy is increasing as one moves from the metering fix altitude to the optimal cruise altitude. As before, matching is accomplished (of speed and altitude) at the top of the descent point.

Figure 2:
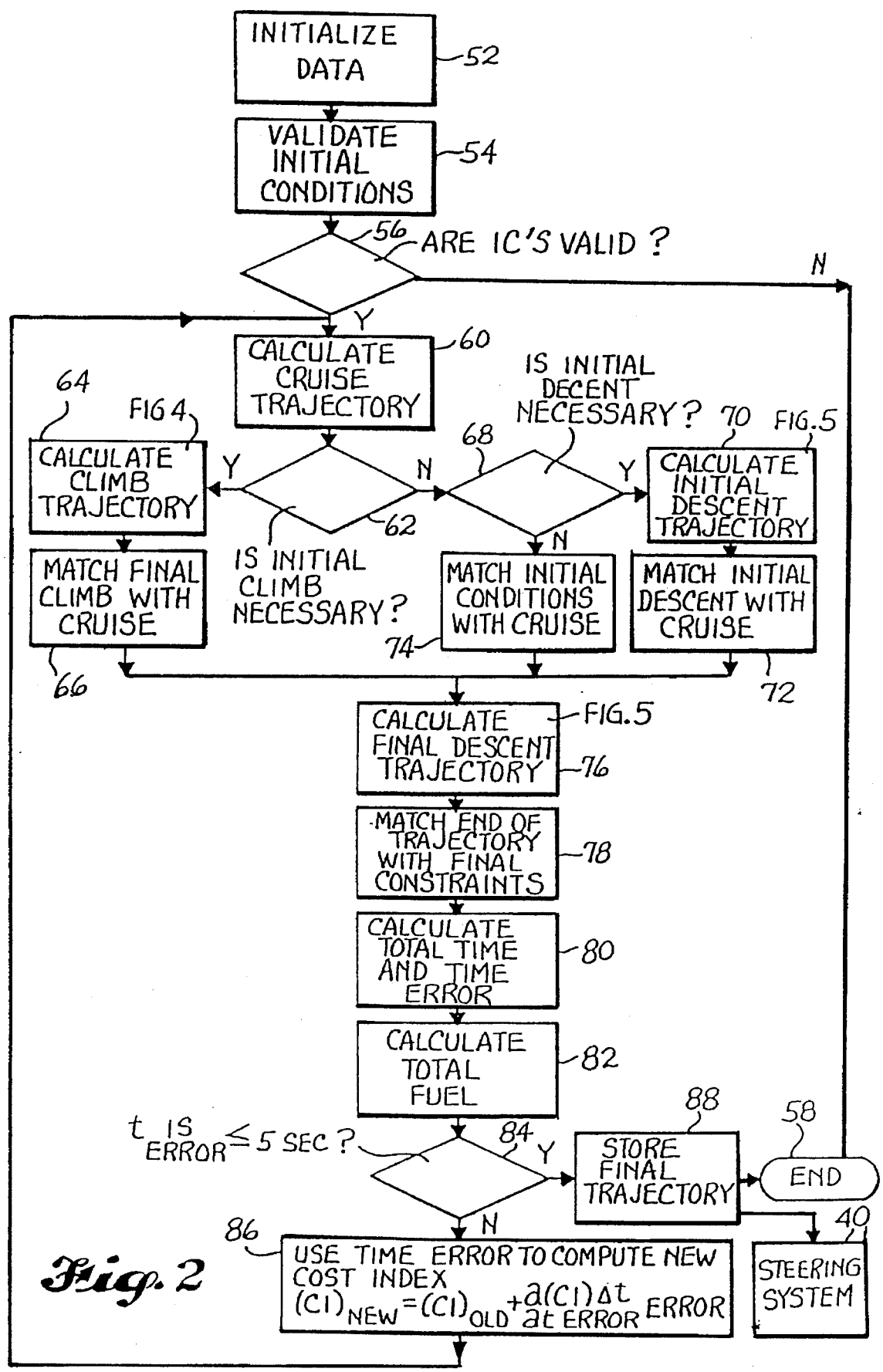
FIG. 2 is a logic flow diagram illustrating the overall cruise climb-descent modes of operation as performed by the onboard computer.

FIG. 2 is a detailed logic flow diagram illustrating the logical steps performed by the onboard computer (30 of FIG. 1) during cruise climb-descent modes of operation. At block 52, the computer inputs the present data signal levels. This data corresponds to input system monitor signals corresponding to real time aircraft parameters, stored values corresponding to aircraft characteristics, and flight crew input information, such as a rescheduled time of arrival. A redundancy system, illustrated at block 54, validates the initial input conditions. Modern commercial aircraft employs multiple redundant sensors and corresponding voting systems to select appropriate sensor signals. These voting systems include fault detection apparatus which indicates the presence of a fault condition. Thus, at block 54 a check is made by the onboard computer to assure that the input initial conditions are valid.

A further diagnostic is performed at 56 in which all integrated circuits in the onboard computer are checked by internal diagnostics. Such internal diagnostic systems for integrated circuits are well known in the art and, as such, will not be described in detail herein. If, at block 56, either all of the computer's integrated circuits do not test as being valid, or at block 54 invalid initial conditions are present, the system promptly sequences to an end block 58 in which no target values are produced.

If, however, both valid conditions and valid IC's are detected at block 56, the cruise trajectory is calculated at block 60.

Figure 3:
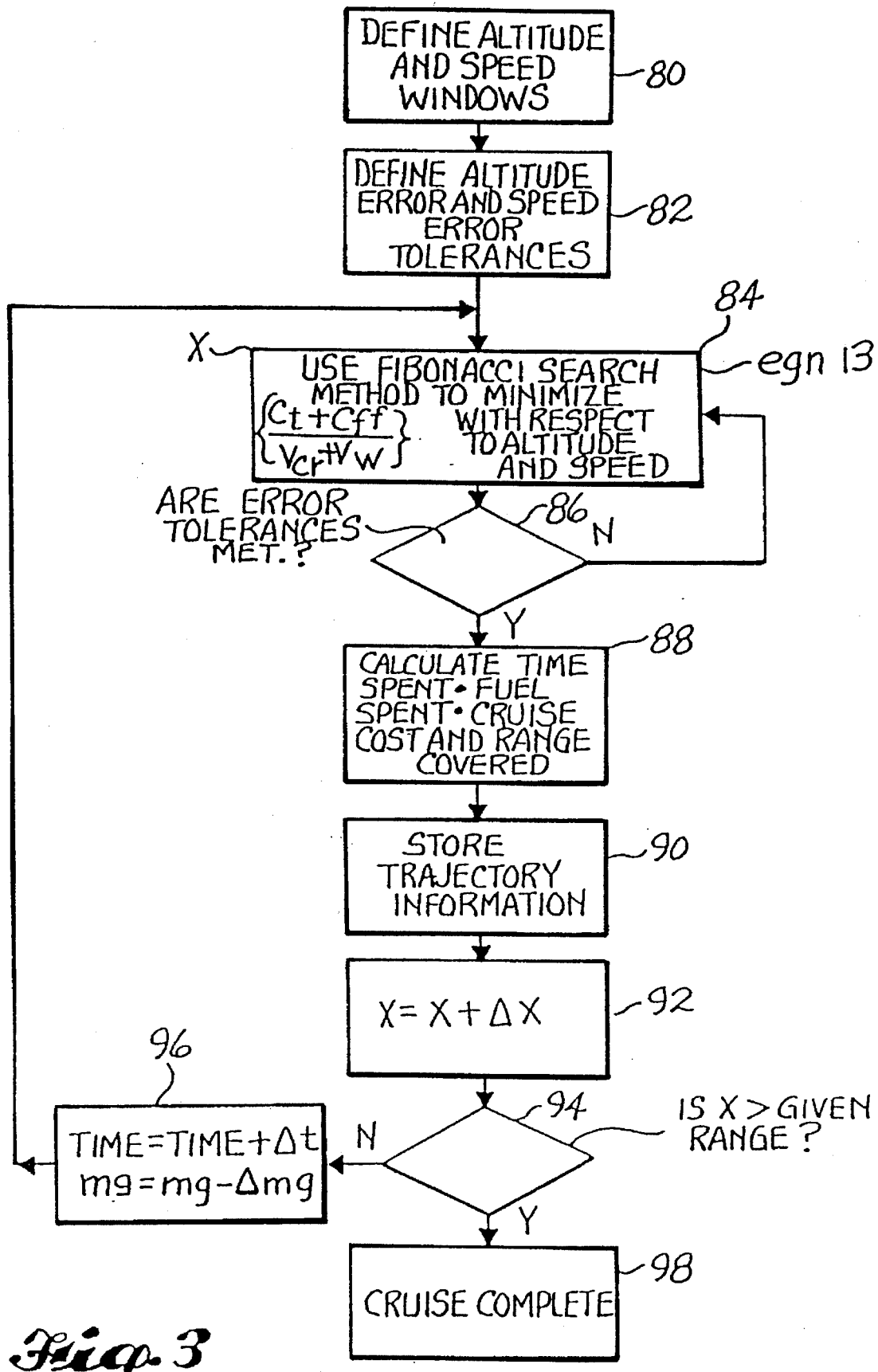
FIG. 3 is a detailed logic flow diagram illustrating each step performed by the onboard computer in producing target cruise trajectory signals.

FIG. 3 is a detailed logic flow diagram illustrating the steps performed in the cruise trajectory calculation 60 of FIG. 2. First, at block 80, input altitude and speed windows are defined. These values are generally produced either as direct inputs from the pilot or are memory stored and correspond to the maximum and minimum values of altitude and speed that are acceptable.

Then, at block 82, altitude error and speed error tolerances are defined. These values, which may be either memory stored or pilot input, correspond to the maximum acceptable error in altitude and speed tolerances which will be accepted during the following cruise trajectory calculations, i.e., if the calculated trajectory value falls within the error tolerances, the calculated value will be acceptable as a target level.

At block 84 the Fibonacci search method is then used to minimize the ratio of:

$$(C_t + C_f)/(V_{cr} + V_w)$$

with respect to altitude and speed. In other words, the minimization of equation (13) is performed. All $\lambda m$ terms are deleted under the assumption that $\lambda m$ is negligible.

At block 86 a test is performed. If the calculated altitude and speed values are outside of the windows and error tolerances as defined in blocks 80, 82, respectively, the test at block 86 fails and a recalculation is done in accordance with block 84. Upon the calculated values being within acceptable tolerances, block 88 is entered at which point calculations are made of the time spent, fuel spent and cruise cost and range covered if the suggested trajectory and thrust target values produced from block 84 are accepted. This trajectory information is then stored in block 90, with an update of range being performed in block 92 according to the equation:

$$x = x + \Delta x.$$

A test is then performed at block 94. If the present value of range, as determined in block 92 is less than the given range value, then an update is performed at block 96 of time and weight (=mg). These values are then reinserted into the Fibonacci search method of block 84 and new target values are calculated. If, however, at block 94 the present value of range as determined by block 92 is greater than the given range value, then the cruise mode is complete, as indicated by block 98, and the system returns to block 60 of FIG. 2.

Referring again to FIG. 2, once the cruise mode is completed at block 60, a test is done at block 62. The test at block 62 determines whether or not an initial climb is necessary to ascend from the present cruise trajectory to a higher trajectory. If the test at block 62 indicates that climb must be accomplished, the computer then calculates the climb trajectory as indicated at block 64.

Figure 4:
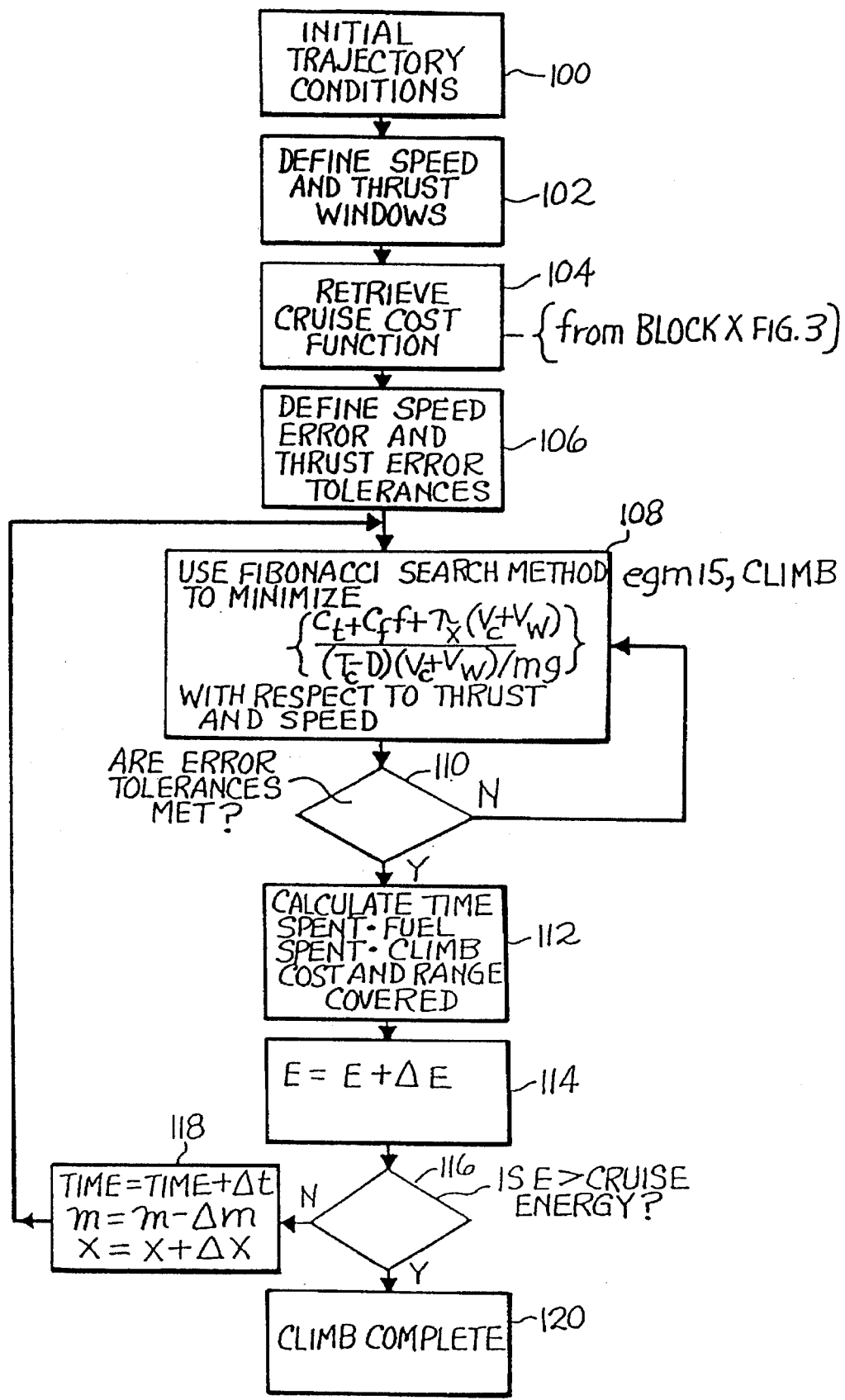
FIG. 4 is a detailed logic flow diagram illustrating each step performed by the onboard computer in producing target climb trajectory signals.

FIG. 4 is a detailed logic flow diagram illustrating the steps performed by the onboard computer to calculate the climb trajectory target values. Here, initial trajectory conditions are input at block 100. Then, at block 102, either pilot or onboard stored system speed and thrust windows are defined. At block 104, the cruise cost function, which is produced at the output of block 84 of FIG. 3, is retrieved. Then, at block 106, the speed error and thrust error tolerances are defined, just as the altitude error and airspeed error tolerances were defined in block 82 of FIG. 3.

Now, at block 108, the Fibonacci search method is used to minimize the expression $$(C_t + C_f + \lambda_x(V_c + V_w))/((T_c - D)(V_c + V_w)/mg)$$

with respect to thrust and speed. That is, the minimization in accordance with equation (15) is performed. Again, all $\lambda m$ terms are deleted under the assumption that $\lambda m$ is negligible. This results in target thrust and speed signals which, in block 110, are compared to the thrust and speed error tolerance values. If the target values are not within the error tolerances, a recalculation is done in block 108. This recalculation continues until the error tolerances are met, as determined by block 110, whereby, in block 112 a calculation is made of time spent, fuel spent, climb cost and range covered in accordance with the calculated target values. Then, at block 114, energy height (specific energy) is updated. If the energy height calculated from block 114 is not greater than the predefined cruise energy as determined by block 116, time, weight and range are updated, as indicated by block 118, and the minimization technique of block 108 is again entered to recalculate target values. When block 116 determines that the energy height is greater than the predefined cruise energy, the climb mode is then complete, as indicated by block 120, and the system reverts to block 66 of FIG. 2. Referring again to FIG. 2, in block 66 the final climb value is matched with the cruise value to assure continuity.

If the test at block 62 indicates that an initial climb is not necessary, the system determines at block 68 whether an initial descent is necessary. If an initial descent is necessary, block 70 is entered, in which the onboard computer calculates initial descent trajectory target values. The initial descent trajectory values are calculated in accordance with the detailed logic flow diagram of FIG. 5, as described below. The calculated initial descent trajectory values are matched at the cruise altitude with cruise in block 72 to assure continuity.

If the test at block 68 indicates that an initial descent is not necessary, again the initial conditions are matched with cruise values at block 74. The system then enters the final descent trajectory calculations, indicated by block 76.

Figure 5:
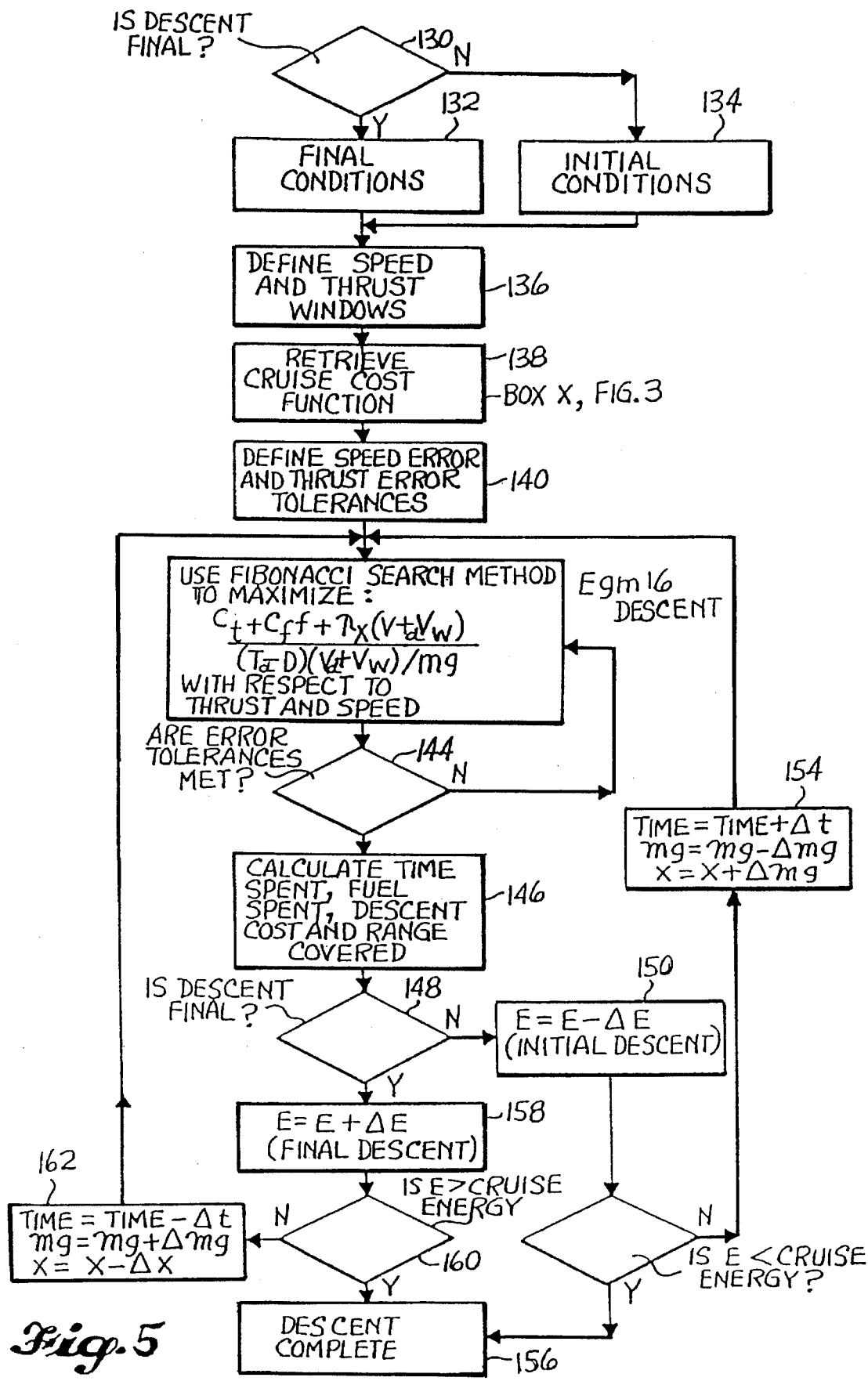
FIG. 5 is a detailed logic flow diagram illustrating each step performed by the onboard computer in producing target descent trajectory signals.

FIG. 5 is a detailed logic flow diagram illustrating both the initial and final descent trajectory calculations as indicated by blocks 70 and 76 of FIG. 2. Referring to FIG. 5, a test at block 130 determines whether an initial or final descent is being accomplished. If a final descent is being accomplished, block 132 is entered at which point final conditions are input. If an initial descent is being accomplished, a block 134 is entered at which point the initial conditions are entered.

Then, at block 136, speed and thrust windows are defined either by the pilot or are stored in the onboard system. At block 138, the cruise cost function is retrieved from block 84 of FIG. 3. Speed error and thrust error tolerances are defined at block 140. Now, in block 142, the Fibonacci search method is used to maximize the expression $$(C_t + C_f + \lambda_x(V_d + V_w))/((T_d - D)(V_d + V_w)/mg)$$

with respect to thrust and speed, corresponding to equation (16). Again, $\lambda m$ terms are deleted with the assumption that $\lambda m$ is negligible.

A test is then made at block 144 to determine whether or not the error tolerances are met. If the error tolerances are not met, the search method of block 142 is then reentered to calculate new target values. This process continues until acceptable values are output from block 144 to block 146 at which point the onboard computer calculates time spent, fuel spent and descent cost and range covered for the target thrust and speed values. Again, a test is made at block 148 to determine whether or not the descent is a final descent. If the descent is an initial descent, a block 150 is entered at which the present energy height value is updated. With this value updated, a test is performed at block 152 to determine whether the present energy height is less than a predetermined cruise energy. If it is not less than the predetermined cruise energy, time, weight (mg) and range x are updated in block 154 and the Fibonacci search method of block 142 is again entered to calculate new target values. If, however, the energy height value is less than the cruise energy level, descent is indicated as being complete at block 156.

If the test at block 148 indicates that descent is final, block 158 is entered at which point energy height is updated for final descent. A test is then performed at block 160 to determine whether the energy height is greater than the predefined cruise energy. If energy height is less than the cruise energy, time, weight and range are updated, in accordance with block 162. The Fibonacci search method of block 142 is then entered to calculate new target values. If, at block 160, it is determined that energy height is greater than the cruise energy, descent is complete as indicated by block 156, whereby the overall system of FIG. 2 is again entered.

Referring again to FIG. 2, once the final descent trajectory out of block 76 is achieved, the end of trajectory values are matched with the final constraints in accordance with block 78. Then, in block 80, the onboard computer calculates the total time and time error values. At block 82, a calculation is made of total fuel. A test is then performed at 84 to determine whether or not the calculated time error is less than a specified value, here indicated as 5 seconds. If the time error is not less than 5 seconds, the time error is used, in block 86, to calculate a new cost index in accordance with the equation indicated in block 86. With this new cost index, the cruise trajectory targets of block 60 are again calculated.

If time error is determined to be less than the predetermined limit at block 84, the system stores the final trajectory values in block 88, both indicating the end of trajectory calculations, in block 58, and outputting the target values to the aircraft's steering system 40 (as also shown in FIG. 1).

In summary, an onboard, time responsive flight optimization system, capable of producing target trajectory and thrust levels for producing optimal cost effectiveness has been described in detail. The features of this invention include the capability to:

a) Iterate on the cost index and arrive at the assigned time in optimal fashion;

b) Realize considerable savings potential over the conventional "hold" strategy;

c) Use multiple regression drag and fuel flow models which are sufficiently smooth to avoid arrival time discontinuities;

d) Use singular perturbation theory to reduce the order of system dynamics; and e) Generate optimal commands using the Fibonacci search technique, therefore avoiding the computation time associated with the calculation of a derivative.

While a preferred embodiment of the invention has been described in detail, it should be apparent that many modifications and variations thereto are possible, all of which fall within the true spirit and scope of the invention.

I claim:

1. An aircraft real time-responsive trajectory optimization system comprising:

monitor means for producing signals representative of selected real time aircraft parameters;

memory means for recalling signals representative of predetermined aircraft performance characteristics including signals representative of aircraft time cost, $C_T$, fuel cost, $C_f$, and the acceleration due to gravity, g;

input means for producing signals representative of a desired aircraft arrival time and place of arrival;

processing means for processing the signals produced by said monitor means, memory means and input means and producing target aircraft trajectory and speed signals corresponding to an optimum cost effectiveness flight trajectory for arriving at said desired arrival time;

said monitor means producing signals representative of fuel flow rate, f, airspeed, V, windspeed, $V_w$, thrust, T, drag, D, and aircraft mass, m; and said processing means producing aircraft thrust and airspeed target values which minimize the value of the expression;

$$\min_{T,V} \left\{ C_t + (C_f - \lambda_m)f + \lambda_x(V + V_w) + \lambda_E \frac{(V + V_w)(T - D)}{mg} \right\} = 0,$$

where $\lambda_x$, $\lambda_m$ and $\lambda_E$ are predeterminedly calculated signal values corresponding to range, mass and energy adjoint variables, respectively, and aircraft steering system means responsive to said target aircraft trajectory and speed signals to produce said optimum trajectory.

2. The trajectory optimization system of claim 1 wherein said processing means includes means for producing target cruise altitude, h, and target cruise airspeed $V_{cr}$, signals and said range adjoint variable $\lambda_x$ for those values of h and $V_{cr}$ which, for the condition of thrust equalling drag, minimize the value of the expression:

$$-\lambda_x = \min_{h, V_{cr}} \left\{ \frac{C_t + (C_f - \lambda_m)f}{V_{cr} + V_w} \right\}_{T=D}$$

3. The trajectory optimization system of claim 2 wherein said processing means includes means for producing target climb airspeed, $V_c$, and target climb thrust, $T_c$, signals and said energy adjoint variable, $\lambda_E$ for those values of $V_c$ and $T_c$ which, at the condition of a given aircraft energy, E, minimize the value of the expression:

$$\lambda_E = \frac{-\min}{V_c, T_c \leq T_{max}} \left\{ \frac{C_t + (C_f - \lambda_m)f + \lambda_x(V_c + V_w)}{(T_c - D)(V_c + V_w)/mg} \right\}_E,$$

wherein $T_{max}$ is a predetermined maximum thrust signal level produced by said memory means.

4. The trajectory optimization system of either claim 2 or claim 3 wherein said processing means includes means for producing target descent airspeed, $V_d$, and target descent thrust, $T_d$, signals and said energy adjoint variable, $\lambda_E$ for those values of $V_d$ and $T_d$ which, at a given aircraft energy, E, maximize the value of the expression:

$$\lambda_E = \genfrac{}{}{0pt}{}{-\max}{V_d, T_d \geq T_{min}} \left\{ \frac{C_t + (C_f - \lambda_m)f + \lambda_x(V_d + V_w)}{(T_d - D)(V_d + V_w)/mg} \right\}_E,$$

wherein $T_{min}$ is a predetermined minimum thrust signal level produced by said memory means.

5. The trajectory optimization system of any one of claims 1, 2 or 3 wherein said processing means includes means for treating said $\lambda_m$ signal as having negligible value.

6. The trajectory optimization system of claim 4 wherein said processing means includes means for treating said $\lambda_m$ signal as having negligible value.

7. A method for producing optimal aircraft time-responsive trajectory target signals comprising the steps of:
   a) producing signals representative of selected predetermined real time aircraft parameters including fuel flow rate, f, airspeed, V, windspeed, $V_W$, thrust, T, drag, D, and aircraft mass;
   b) producing signals representative of predetermined aircraft performance characteristics including aircraft time cost, $C_t$, fuel cost, $C_f$, and acceleration due to gravity, g;
   c) producing signals representative of an input desired aircraft arrival time and place of arrival;
   d) providing processing means for predeterminedly processing said signals produced in step a), b) and c) and producing aircraft thrust and airspeed target values to minimize the value of the expression $$\genfrac{}{}{0pt}{}{\min}{T,V} \left\{ C_t + (C_f - \lambda_m)f + \lambda_x(V + V_w) + \lambda_E \frac{(V + V_w)(T - D)}{mg} \right\} = 0,$$

where $\lambda_x$, $\lambda_m$ and $\lambda_E$ are predeterminedly calculated signal values corresponding to the range, mass and energy adjoint variables, respectively, such signals representing target aircraft trajectory and speed signals corresponding to an optimum cost effectiveness flight trajectory for arriving at said desired place and said desired arrival time; and
   e) providing aircraft steering means responsive to said target signals to produce said optimum trajectory.

8. The method of claim 7 wherein said provided processing means produces target cruise altitude, h, and target cruise airspeed, $V_{cr}$, signals and said range adjoint variable, $\lambda_x$, for those values of h and $V_{cr}$ which, for the condition of thrust equalling drag, minimize the value of the expression:

$$-\lambda_x = \genfrac{}{}{0pt}{}{\min}{h, V_{cr}} \left\{ \frac{C_t + (C_f - \lambda_m)f}{V_{cr} + V_w} \right\}_{T=D}$$

9. The method of claim 8 wherein said provided processing means produces target climb airspeed, $V_c$, and target climb thrust, $T_c$, signals and said energy adjoint variable, $\lambda_E$ for those values of $V_c$ and $T_c$ which, at the condition of a given aircraft energy, E, minimize the value of the expression:

$$\lambda_E = \genfrac{}{}{0pt}{}{-\min}{V_c, T_c \leq T_{max}} \left\{ \frac{C_t + (C_f - \lambda_m)f + \lambda_x(V_c + V_w)}{(T_c - D)(V_c + V_w)/mg} \right\}_E,$$

wherein $T_{max}$ is a predetermined maximum thrust level signal.

10. The method of either claims 8 or 9 wherein said provided processing means produces target descent airspeed, $V_d$, and target descent thrust, $T_d$, signals and said energy adjoint variable signal, $\lambda_E$ for those values of $V_d$ and $T_d$ which, at a given aircraft energy, E, maximize the value of the expression:

$$\lambda_E = \genfrac{}{}{0pt}{}{-\max}{V_d, T_d \geq T_{min}} \left\{ \frac{C_t + (C_f - \lambda_m)f + \lambda_x(V_d + V_w)}{(T_d - D)(V_d + V_w)/mg} \right\}_E,$$

wherein $T_{min}$ is a predetermined minimum thrust signal level.

11. The method of any one of claims 7, 8 or 9 wherein said provided processing means treats said signal $\lambda m$ as having negligible value.

12. The method of claim 10 wherein said provided processing means treats said signal $\lambda_m$ as having negligible value.

* * * * *